US010929200B1

(12) United States Patent
Whitehead (10) Patent No.: US 10,929,200 B1
(45) Date of Patent: Feb. 23, 2021

(54) LIVE RUNTIME INFRASTRUCTURE ORCHESTRATION

(71) Applicant: International Business Machines Corporation, Armonk, NY (US)

(72) Inventor: Matthew Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/571,223

(22) Filed: Sep. 16, 2019

(51) Int. Cl.
*G06F 9/52* (2006.01)
*G06F 9/445* (2018.01)

(52) U.S. Cl.
CPC .......... *G06F 9/526* (2013.01); *G06F 9/44505* (2013.01)

(58) Field of Classification Search
CPC .............................. G06F 9/526; G06F 9/44505
USPC ...................................... 710/200, 104; 713/1
See application file for complete search history.

(56) References Cited

U.S. PATENT DOCUMENTS

| | | | | |
|---|---|---|---|---|
| 4,570,217 | A * | 2/1986 | Allen | G06F 9/4881 700/83 |
| 5,875,136 | A * | 2/1999 | Hsuan | G11C 29/808 365/200 |
| 5,991,753 | A | 11/1999 | Wilde | |
| 6,363,434 | B1 * | 3/2002 | Eytchison | H04L 12/40058 375/E7.019 |
| 6,606,685 | B2 | 8/2003 | Huxoll | |
| 6,845,451 | B1 * | 1/2005 | Anand | G06F 21/31 709/223 |
| 7,783,788 | B1 * | 8/2010 | Quinn | G06F 9/5077 710/8 |
| 7,860,961 | B1 * | 12/2010 | Finkelstein | H04L 12/4641 709/223 |
| 7,912,955 | B1 * | 3/2011 | Machiraju | G06F 9/5077 709/226 |
| 8,108,937 | B1 * | 1/2012 | Sallam | G06F 21/55 726/27 |
| 8,676,622 | B1 | 3/2014 | Ward, Jr. | |
| 8,918,791 | B1 * | 12/2014 | Chudgar | G06F 9/526 718/104 |
| 9,135,031 | B1 * | 9/2015 | Knight | G06F 3/061 |
| 9,178,766 | B2 | 11/2015 | Kramer | |
| 9,218,251 | B1 * | 12/2015 | Hemashekar | G06F 11/1458 |
| 9,251,033 | B2 * | 2/2016 | Kirchhofer | G06F 9/5083 |
| 9,678,683 | B1 | 6/2017 | Chen | |
| 10,216,546 | B1 * | 2/2019 | Davison | G06F 16/9024 |

(Continued)

OTHER PUBLICATIONS

"dlfcn.h—dynamic linking", The Single UNIX 8 Specification, Version 2, Copyright © 1997 The Open Group, 1 page, <http://pubs.opengroup.org/onlinepubs/7908799/xsh/dlfcn.h.html>.

*Primary Examiner* — Paul R. Myers
(74) *Attorney, Agent, or Firm* — Joseph P. Curcuru (57) ABSTRACT

Disclosed is a computer-implemented method of provisioning resources associated with a plurality of instances of a computer system, the resources being allocated at runtime and only for instances of the computer system which use the resources, comprising: intercepting a call for access the computer system to a resources; responsive to the intercepted call being a first call for access by the computer system to the resource: blocking further calls for access by the computer system to the resource; binding the instances of a computer system to the resource; configuring the resource; and unblocking further calls for access by the computer system to the resource.

14 Claims, 5 Drawing Sheets

(56) References Cited

U.S. PATENT DOCUMENTS

| | | | |
|---|---|---|---|
| 2002/0004883 A1* | 1/2002 | Nguyen | G06F 3/0613 |
| | | | 711/111 |
| 2004/0199810 A1* | 10/2004 | Tarcea | G06F 3/061 |
| | | | 714/6.3 |
| 2005/0044228 A1* | 2/2005 | Birkestrand | G06F 9/5072 |
| | | | 709/226 |
| 2009/0019535 A1* | 1/2009 | Mishra | G06Q 30/04 |
| | | | 726/12 |
| 2009/0307285 A1* | 12/2009 | Gipp | G06F 11/1458 |
| 2010/0050173 A1* | 2/2010 | Hensbergen | G06F 9/5072 |
| | | | 718/1 |
| 2010/0293269 A1* | 11/2010 | Wilson | H04L 41/5054 |
| | | | 709/224 |
| 2012/0158806 A1* | 6/2012 | Snyder | G06F 16/1827 |
| | | | 707/827 |
| 2012/0278365 A1* | 11/2012 | Labat | G06F 16/9024 |
| | | | 707/798 |
| 2014/0068546 A1* | 3/2014 | Balasubramanian | G06F 8/61 |
| | | | 717/104 |
| 2014/0108792 A1 | 4/2014 | Borzycki | |
| 2014/0149594 A1* | 5/2014 | Amorim | G06F 15/17306 |
| | | | 709/229 |
| 2016/0335004 A1* | 11/2016 | Jones | G06F 9/45558 |
| 2017/0206463 A1* | 7/2017 | Arndt | G06F 9/542 |
| 2019/0042314 A1* | 2/2019 | Verrall | G06F 9/4881 |
| 2019/0220315 A1* | 7/2019 | Vallala | G06F 9/5033 |
| 2020/0106782 A1* | 4/2020 | Sion | H04L 67/10 |

\* cited by examiner

LIVE RUNTIME INFRASTRUCTURE ORCHESTRATION

BACKGROUND

The present invention relates to container orchestration and more specifically to live runtime infrastructure orchestration.

Pre-defining resources for a given computer system using an orchestration framework may ensure that all of the necessary resources for the computer system exist and are configured before the computer system components are started. An example of deployment may include configuration of networking, storage, pre-requisite components, configuration files and security credentials for each instance of the computer system. Such deployment means that it is necessary to reserve ahead of time all of the resources for each and every instance of the computer system. This works in an environment where every instance of the computer system requires all of the resources. However, where only a single instance of the computer system among the many instances of the computer system requires certain resources, then such deployment is not very efficient.

SUMMARY

According to an embodiment of the invention, a computer-implemented method of provisioning resources associated with a plurality of instances of a computer system, said resources being allocated at runtime and only for instances of said plurality of instances of a computer system which use said resources, comprises intercepting a call for access by one of said plurality of instances of a computer system to a one of said resources; responsive to said intercepted call being a first call for access by said one of said plurality of instances of a computer system to said one of said resources: blocking further calls for access by said one of said plurality of instances of a computer system to said one of said resources; configuring said one of said resources; binding said one of said plurality of instances of a computer system to said one of said resources; and unblocking further calls for access by said one of said plurality of instances of a computer system to said one of said resources.

Embodiments of the invention provide apparatus for provisioning resources associated with a plurality of instances of a computer system, said resources being allocated at runtime and only for instances of said plurality of instances of a computer system which use said resources, comprising: a function hook layer module which: intercepts a call for access by one of said plurality of instances of a computer system to a one of said resources; responsive to said intercepted call being a first call for access by said one of said plurality of instances of a computer system to said one of said resources: blocks further calls for access by said one of said plurality of instances of a computer system to said one of said resources; configures said one of said resources; binding said one of said plurality of instances of a computer system to said one of said resources; and unblocks further calls for access by said one of said plurality of instances of a computer system to said one of said resources.

Embodiments of the invention also provide a computer program product for provisioning resources associated with a plurality of instances of a computer system, said resources being allocated at runtime and only for instances of said plurality of instances of a computer system which use said resources, the computer program product comprising: a computer readable storage medium having program instructions embodied therewith, the program instructions executable by a computer to cause the computer to: intercept a call for access by one of said plurality of instances of a computer system to a one of said resources; responsive to said intercepted call being a first call for access by said one of said plurality of instances of a computer system to said one of said resources: block further calls for access by said one of said plurality of instances of a computer system to said one of said resources; configure said one of said resources; bind said one of said plurality of instances of a computer system to said one of said resources; and unblock further calls for access by said one of said plurality of instances of a computer system to said one of said resources.

DETAILED DESCRIPTION

Orchestration is the automated configuration, coordination and management of computer systems and software. A container is an abstraction at the application layer that packages up code and all its dependencies so that the application runs quickly and reliably from one computing environment to another. Multiple containers may run on the same computer and may share the operating system kernel with other containers, each container running as isolated processes in user space.

Figure 1:
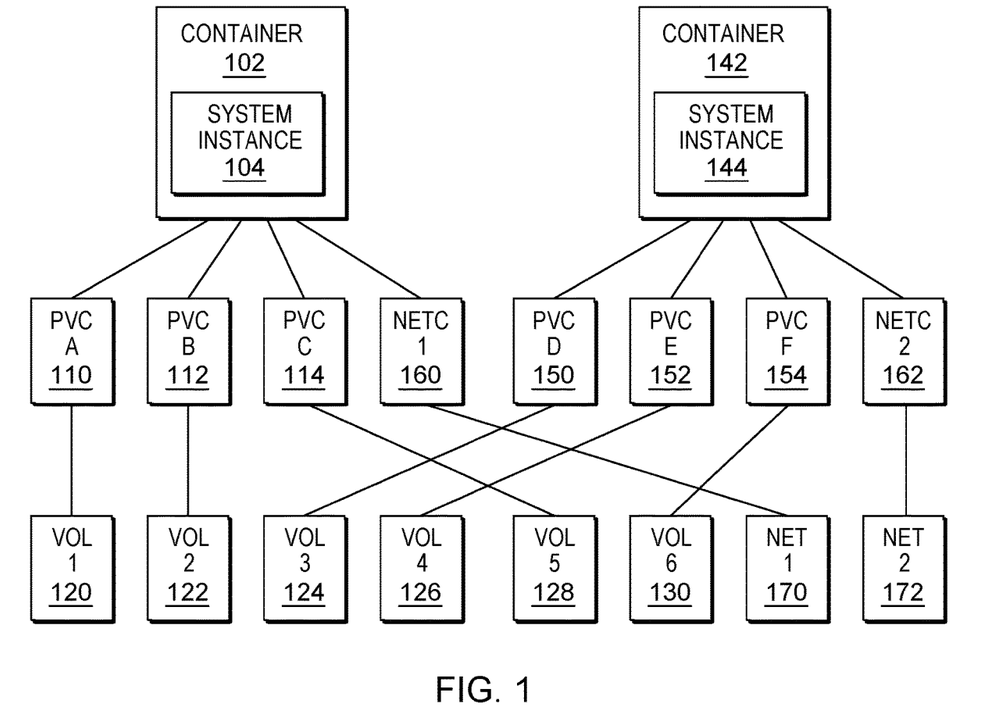
FIG. 1 is a block diagram of a computer system in which embodiments of the present invention may be implemented.

FIG. 1 shows container 102 containing system instance 104 and container 142 containing system instance 144, wherein container 102 will be referred to as first container 102, system instance 104 will be referred to as first system instance 104, container 142 will be referred to as second container 142, and system instance 144 will be referred to as second system instance 144, herein. First container's 102 volume requirements are mapped to persistent volumes (VOL) 120, 122, 128 using persistent volume claims (PVC) 110-114. Second container's 142 volume requirements are mapped to persistent volumes 124, 126, 130 (VOL) using persistent volume claims (PVC) 150-154. In an exemplary embodiment, first container 102 may be mapped using PVC 110 to persistent volume 120 so that it has access to read data, using PVC 112 to persistent volume 122 so that it can write log and trace files and using PVC 114 to persistent volume 128 so that it can read and write persistent state. Similarly, second container 142 may be mapped using PVC 150 to persistent volume 124 so that it has access to read data, using PVC 152 to persistent volume 126 so that it can write log and trace files and using PVC 154 to persistent volume 130 so that it can read and write persistent state. Embodiments of the invention may have other mappings using other PVCs 110-114, 150-154 for other purposes and may also not have some or even any of the mappings described above. Embodiments of the invention may have any number of mappings to any number of persistent volumes 120-130 such that at least one of the resources is a storage volume.

First container 102 may also be mapped to networking component (NET) 170 using networking configuration (NETC) 160 and second container 142 may also be mapped to networking component (NET) 172 using networking configuration (NETC) 162. Embodiments of the invention may have mappings to any number of networking components or resources, such that at least one of the resources is a networking component. Embodiments of the invention may have mappings to other resources such as pre-requisite components and configuration files, such that at least one of the resources is a pre-requisite component, a configuration file or a secret.

Figure 2:
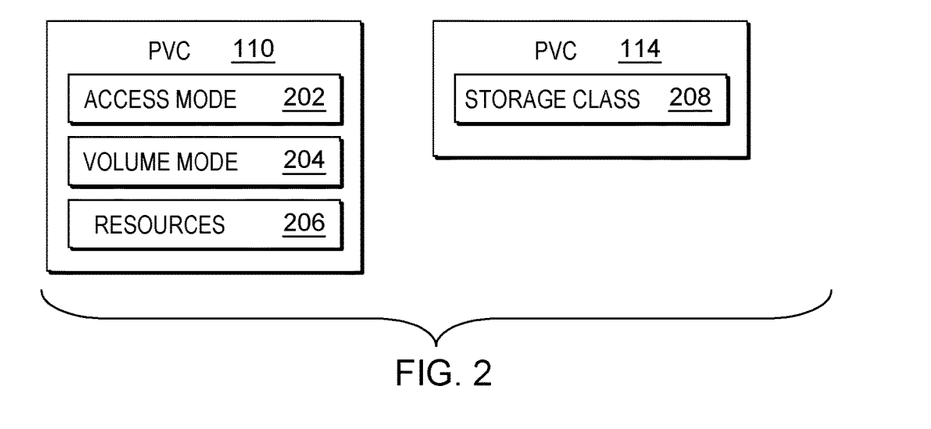
FIG. 2 is a block diagram of the PVC of FIG. 1.

FIG. 2 is a block diagram of PVC 110 and PVC 140 of FIG. 1. PVC 110 may comprise access mode 202, volume mode 204 and resources 206. PVC 114 may comprise storage class 208 for dynamic provisioning of volumes. PVC 110 and PVC 114 are conventional PVCs, the format and usage of which will be familiar to persons skilled in the art.

When container 102 and/or container 142 are started, each of the PVCs 110-114, 150-154 is reconciled against the available persistent volumes 120-130. The persistent volumes 120-130 are mounted to paths in a file system as is well known to persons skilled in the art. Typically, a first system instance 104 may not need to write trace files until a user needs to capture trace for diagnosis. Conventionally, a persistent volume 120-130 is permanently assigned to first system instance 104 so as to be ready in case a trace file is to be written. In embodiments of the invention, persistent volume 120-130 used for writing trace files is marked as mounted and the mount point in the container 102 and/or container 142 exists. However, unless and until a request is made to open a file path underneath the mount point, persistent volume 120-130 is not bound to the container 102 and/or container 142. In embodiments of the invention using a public cloud environment, such as Amazon's AWS EKS, where a charge is made for an AWS EBS volume when it is mounted, the charge need not be paid until the volume is actually needed, rather than when the system resources are orchestrated.

Other resources which may similarly only be bound when they are actually used include secrets and configuration maps. Secrets may contain sensitive data that is securely distributed to a container the needs to have access to the secrets. In embodiments of the present invention, the distribution of a secret to a container is not implemented until an attempt to load the secret is made by system instance 104 and/or system instance 144. This has the advantage that the number of nodes to which secret data is transmitted to is reduced to those that actually require access to the secret data. Configuration maps may be mounted only for system instances 104 and/or system instances 144 that require a particular configuration map. This has the advantage of having a reduction in network traffic if an overall configuration is large.

The advantages of embodiments of the invention may include keeping system exposures, particularly those relating to secret data, to those system instances where the secret data is necessary at runtime, reducing storage costs as storage is only mounted when actually required at runtime and further provides a generally tidier environment that may help compensate for haphazard or incorrect orchestration.

Figure 3:
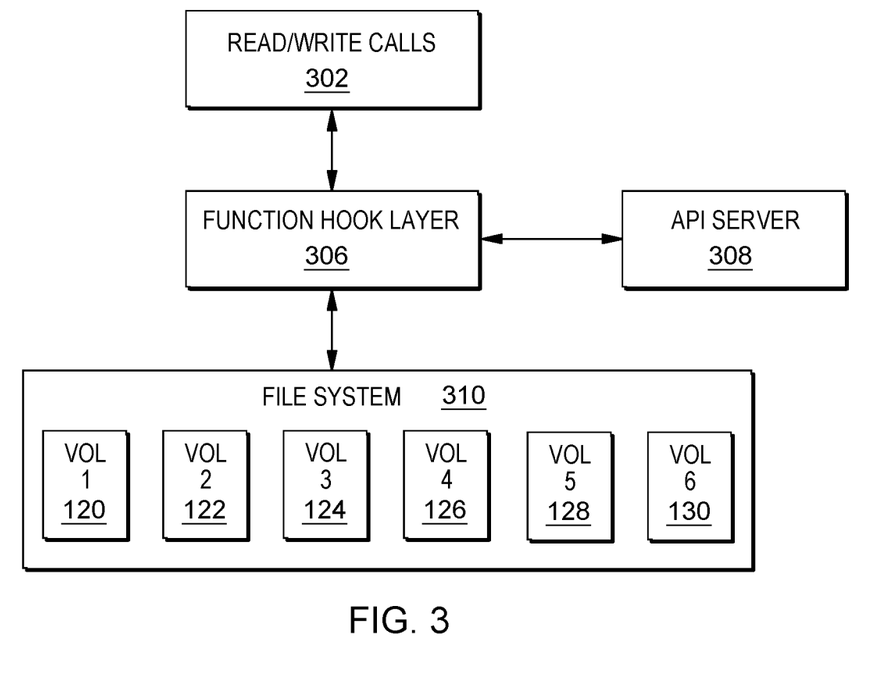
FIG. 3 is a block diagram of intercepting read/write requests to the persistent volumes of FIG. 1.

Referring to FIG. 3, read/write calls 302 made from container 102 and/or container 142 to persistent volumes 120-130 in file system 310 are intercepted by a function hook layer 306. In various embodiments, file system 310 can be a specialized file system. Application Programming Interface (API) Server 308 is used to create the persistent volumes 120-130 and also to satisfy PVCs 110-114 and PVCs 140-144 against real persistent volumes 120-130. By making a first read/write call 302, container 102 and/or container 142 are effectively requesting API server 308 to satisfy the PVC 110-114, 140-144 associated with the read/write call 302 because the container 102 and/or container 142 is requesting to actually make use of the PVC 110-114, 140-144.

Function hook layer 306 may be implemented using a mechanism such as a dynamic linking library (e.g., the Unix® dynamic linking library). Embodiments of the invention are not limited to use with the Unix operating system and other mechanisms that achieve the same function may be used with other operating systems. UNIX is a registered trademark of The Open Group in the United States and other countries.

Function hook layer 306 may also intercept calls 302 to read from and write to a networking component 170 and/or networking component 172 in the same manner as described above for read/write calls 302 to persistent volumes 120-130.

Below is pseudo-code for an example embodiment of an fopen( ) function hook for use in dynamic instantiating of network attached file storage. The pseudo-code uses a Representational State Transfer (REST) API provided by the storage provider that is used to create new file storage. Creation of the storage is followed by a second call to mount the new NFS share, before carrying on with the originally requested call, such as a fopen( ) or fclose( ) call. As described in the program logic below. For example:

```
#include <dlfcn.h>
#include <curl.h>
#include <process.h>
FILE *(*original_fopen)(const char *filename, const char *mode);
/* Keep track of the number of users of the dynamically provisioned */
/* file system. The last caller to close a file in this directory then */
/*optionally tears down the provisioned file system. */
Int usageCount=0;
int main( )
{
/* Load the original platform implementation of fopen( ) and save */
/* it to a function pointer we will call after doing some extra */
/* steps in our intercepting fopen( ) function. */
original_fopen=dlsym(RTLD_NEXT, "fopen");
}
/* Our own implementation of fopen( ), using an identical function signature */
/* to the default fopen( ). */
FILE * fopen(const char *filename, const char *mode)
{
/* The original application arrives here, not in the default platform's */
/* implementation of fopen( ). We do our work to instantiate the */
/* necessary cloud resources, then forward the request to the */
```

```
/* original fopen( ) to continue processing as normal. */
If (strncmp(filename, "/mnt/dynamic-fs", 15)==0)
{
int rc=OK;
if (usageCount==0)
{
CURL *curl;
char    *    RESTApiURL="https://cloud-provider.com/
filestorage/generate"
    /* Create a new file system resource */
    rc=curl_easy_setopt(curl, CURLOPT_URL, RESTApi-
Url);
    rc=curl_easy_perform(curl);
}
if (rc==OK)
{
/* Mount the new file storage */
char *args[5];
args[0]="-t";
args[1]="nfs";
args[2]="acme-cloud-provider.com/filestorage/
ID392434234";
args[3]="/mnt/dynamic-fs"
args[4]=NULL;
rc=spawnl(P_WAIT, "mount", args);
}
if (rc==OK)
{
/* Now we've done our extra work to dynamically
provision and */
/* a file system to use, carry on with the original fopen(
) call. */
usageCount++;
return original_fopen(filename, mode);
}
}
else
{
/* Any fopen( ) requests for files not in/mnt/dynamic-fs
are passed */
/* straight through to the original fopen( ). */
return original_fopen(filename, mode);
}
}
```

Tearing down the provisioned file system resources could optionally be done during the last fclose( ) call. For example:

```
#include <dlfcn.h>
#include <curl.h>
#include <process.h>
int (*original_fclose)(FILE *file);
int main( )
{
/* Load the original platform implementation of fclose( )
and save */
/* it to a function pointer we will call after doing some
extra */
/* steps in our intercepting fclose( ) function. *
/original_fclose=dlsym(RTLD_NEXT, "fclose");
/* Our own implementation of fclose( ), using an identical
function signature */
/* to the default fclose( ). */int
fclose(FILE *file)
{
int fclose_rc=OK;
if (strncmp(filename, "/mnt/dynamic-fs", 15)==0)
{
/* First call the original fclose( ) so any OS calls are
completed before we */
/* unmount and delete the storage. */
fclose_rc=original_fclose(file);
usageCount--;
if (usageCount==0)
{
/* Nobody is using the storage now. Unmount and delete
it. */
char*args[2];
args[0]="/mnt/dynamic-fs"
args[1]=NULL;
rc=spawnl(P_WAIT, "umount", args);
if (rc==OK)
{
CURL *curl;
char    *    RESTApiURL="https://cloud-provider.com/
filestorage/delete/ID392434234"
/* Delete the filesystem now its no longer in use */
rc=curl_easy_setopt(curl, CURLOPT_URL, RESTApi-
Url);
rc=curl_easy_perform(curl);
}
}
}
else
{
/* Any fclose( ) requests for files not in/mnt/dynamic-fs
are passed */
/* straight through to the original fclose( ). */
return original_fclose(file);
}
}
```

There are a variety of operating system calls that may cause files to be opened and closed. Embodiments of the invention include similar function hooks within function hook layer 306 for functions such as open( ), opendir( ), freopen( ) and the like. However, the bulk of the implementation of these function hooks is likely to be nearly identical between these calls and may therefore be made common between them.

Figure 4:
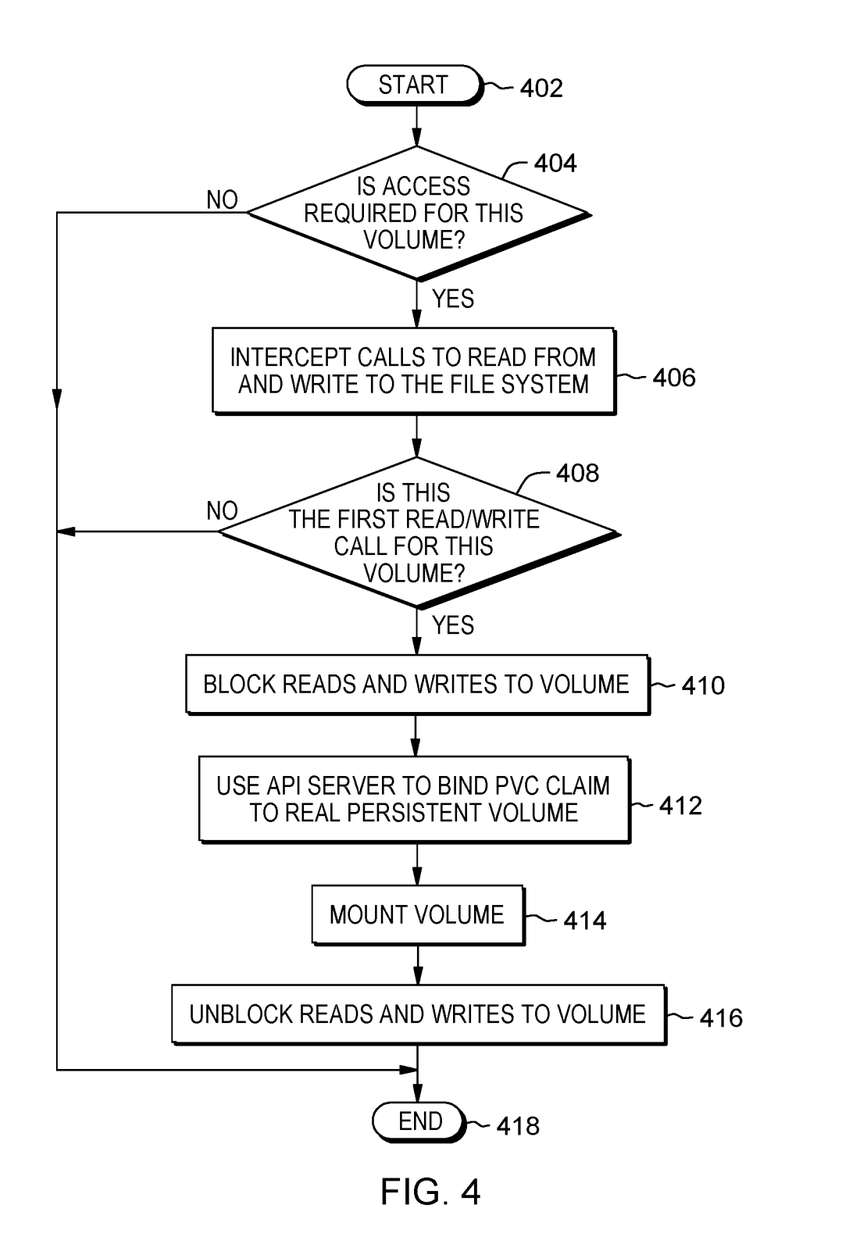
FIG. 4 is a flow chart of a computer-implemented method of intercepting read/write requests to the persistent volumes of FIG. 1.

Referring to FIG. 4, a computer-implemented embodiment of a method according to the present invention of live runtime infrastructure orchestration of persistent volumes 120-130 starts at step 402. At step 404, a check is made as to whether the system instance 104 and/or system instance 134 needs access to the persistent volume 120-130. If the system instance 104 and/or system instance 134 does not need access to persistent volume 120-130 (No Step), then it is unnecessary for that persistent volume 120-130 to be provisioned and it is unnecessary for calls 302 to read from and to write that persistent volume 120-130 to be intercepted and so the computer-implemented method ends at step 418. In embodiments of the invention in which there are mappings to other resources such as pre-requisite components, configuration files or a secret, the check is as to whether the pre-requisite components, configuration files or secret is needed by this system instance. For example, access to a secret may be needed by some system instances, but not by this particular system instance. In respect of these embodiments, references in steps 406 to 416 below to persistent volumes should be interpreted as references to pre-requisite components, configuration files or secrets.

If the system instance 104 and/or system instance 134 does need access to persistent volume 120-130 (Yes Step), then embodiments of the present invention advances to step 406. At step 406, read/write calls 302 made from container 102 and/or container 142 to persistent volumes 120-130 in file system 310 are intercepted by function hook layer 306. In general, in various embodiments, the computer-implemented method intercepts a call for access by the computer system to a resource.

At step 408, a check is made as to whether this is the first read/write call 302 for this persistent volume 120-130, in which this is the first attempt to access the mount point for the persistent volume 120-130. Volume mount points are specialized file system 310 objects which are used to mount and provide an entry point to other volumes. Mount points can be created in a directory on filesystem 310, which gives a reference to the root directory of the mounted persistent volume 120-130. If it is not the first read/write call 302 for this persistent volume 120-130 (No Step), then the computer-implemented method ends at step 418. Responsive to the intercepted call being a first call, such as a read/write call 302, for access by the computer system to the resource, such as the persistent volume 120-130 (Yes Step), then processing proceeds to step 410.

At step 410, further read and write calls 302 for access by the system instance 104 and/or system instance 144 to the resource, such as the persistent volume 120-130, are blocked by the function hook layer 306. At step 412, API server 308 is used to satisfy the PVC 110-114, 150-154 against a real persistent volume 120 and/or persistent volume 122 by binding the system instance 104 and/or system instance 144 to the resource, such as the persistent volume 120-130. At step 414, the resource, such as the volume 120-130 are actually mounted. At step 416, read and write calls 302 for the persistent volume 120-130 are now unblocked for further calls for access by the system instance 104 and/or system instance 144 to the resource, such as the persistent volume 120-130 by the function hook layer 306. In an embodiment, step 410 of blocking, step 412 of binding and step 414 of mounting and step 416 of unblocked are performed by a function hook layer. The computer-implemented method ends at step 418.

After step 416 above, read and write calls 302 for the persistent volume 120-130 function normally as in a prior art computer system. However, in embodiments of this invention, because of the lazy, dynamic, provisioning of the persistent volume 120-130, there is a risk that the dynamic activity may fail. However, such lazy, dynamic provisioning will typically not cause any problems because embodiments of the invention will typically be used for non-essential files such as trace and error logs. It is known in the art that different volume mounts are used for these files so that critical system files are not affected by trace or error log files getting too large.

If required, a fall back option for cases where failure does occur may be implemented by allocating local file storage in the order that system instance 104 and/or system instance 144 may continue to work. In this embodiment, the instance of a computer system (system instance 104) and/or system instance 144 comprises local storage, the local storage being allocated responsive to a failure of the mounting of a resource. The local storage may be used whilst a cloud provider of persistent volumes 120-130 may temporarily be unable to provision some file storage if, for example, its API server 308 is down. Another fall back option may be to fail the container 102 and/or container 142 to the point where dynamic provisioning cannot take place. In some respects, this is no different than failing to deploy container 102 and/or container 142 if resources such as persistent volumes 120-130 are not available at the time of deploy.

System calls to functions such as fopen( ) and fclose( ) have the potential to fail at any time for a variety of reasons. Typically, it would be expected that container 102 and/or container 142 of an application be coded so as to deal with these types of failures and to handle them appropriately. Such failures due to dynamic provisioning are no more likely than failures due to other file operations that involve network activity to network attached storage. Further, there is always the option of configuring embodiments of the invention on or off for each type of application.

Figure 5:
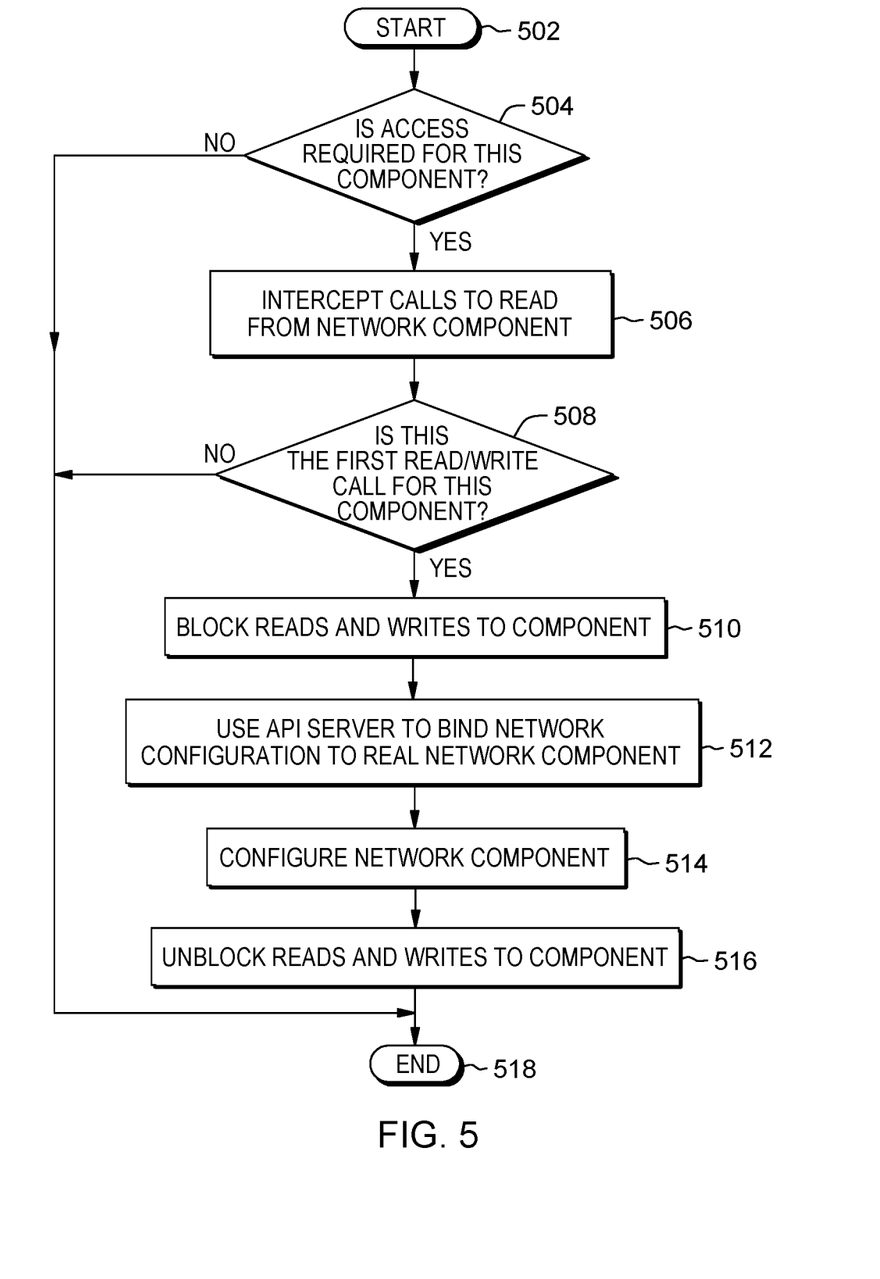
FIG. 5 is a flow chart of a computer-implemented method of intercepting read/write requests to a networking component of FIG. 1.

Referring to FIG. 5, a computer-implemented embodiment of a method according to the present invention of live runtime infrastructure orchestration of network components 170 and/or networking component 172 starts at step 502. At step 504, a check is made as to whether system instance 104 and/or system instance 134 needs access to network component 170 and/or network component 172. If system instance 104 and/or system instance 134 do not need access to network component 170 and/or network component 172 (No Step), then it is unnecessary for network component 170 and/or networking component 172 to be provisioned and it is unnecessary for calls 302 to read from and to write network component 170 and/or networking component 172 to be intercepted and so the computer-implemented method ends at step 518. If the system instance 104 and/or system instance 134 does need access to network component 170 and/or networking component 172 (Yes Step), then the computer-implemented method advances to 506. At step 506, read/write calls 302 made from container 102 and/or container 142 to the network component 170 and/or networking component 172 are intercepted by a function hook layer 306. At step 508, a check is made as to whether this is the first read/write call 302 for network component 170 and/or network component 172. If it is not the first read/write call 302 for network component 170 and/or network component 172 (No Step), then the computer-implemented method ends at step 518. If it is the first read/write call 302 for network component 170 and/or network component 172 (Yes Step), then processing proceeds to step 510.

At step 510, read and write calls 302 for network component 170 and/or networking component 172 are blocked by function hook layer 306. At step 512, API server 308 is used to satisfy networking configurations 160 and/or 162, and PVC 150-154 against a real network component 170 and/or network component 172. At step 514, network component 170 and/or networking component 172 are actually configured. At step 516, read and write calls 302 for the network component 170 and/or networking component 172 are now unblocked by the function hook layer 306. After step 516, read and write calls 302 for network component 170 and/or networking component 172 function normally as in a prior art computer system. The computer-implemented method ends at step 518. In various embodiments, a first resource is only allocated for a subset of instances of a plurality of instances of a computer system based on the subset of instances using the first resource.

Embodiments of the present invention dynamically provision cloud services on first-use within another service based on file access interception and configure duplicate instances of a system with named resources.

Figure 6:
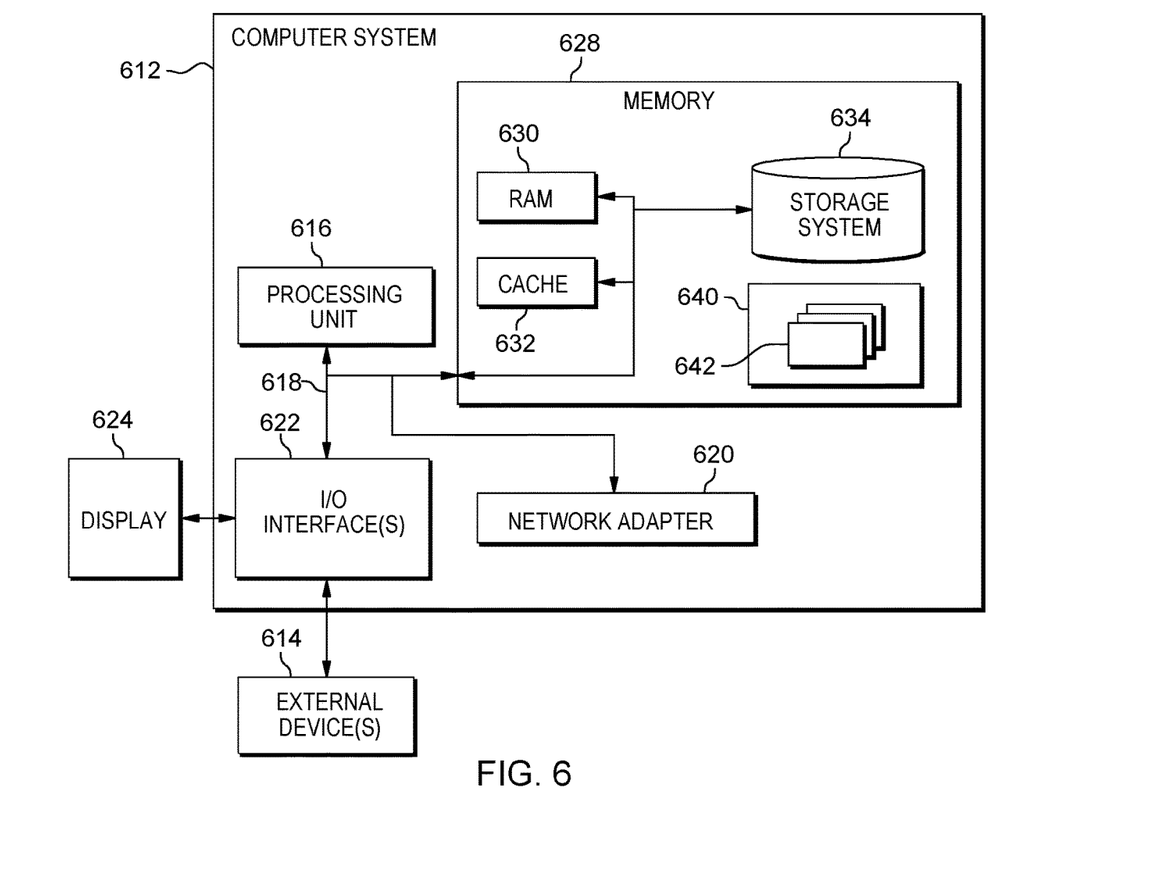
FIG. 6 is a block diagram of a computer system in which embodiments of the present invention may be implemented.

Referring now to FIG. 6, a schematic of an example of computing system is shown. Computing system 612 is only one example of a suitable computing system and is not intended to suggest any limitation as to the scope of use or functionality of embodiments of the invention described herein. Regardless, computing system 612 is capable of being implemented and/or performing any of the functionality set forth hereinabove.

Computer system/server 612 is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 is shown in the form of a general-purpose computing device. The components of computer system/server 612 may include, but are not limited to, one or more processors or processing units (processor) 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for provisioning resources associated with a plurality of instances of a computer system, the method comprising:
   intercepting a call for access to a resource from an instance of the plurality of instances;
   dynamically provisioning cloud services in response to a first use of the resource within another service based on a file access interception;
   responsive to the intercepted call being a first call for access to the resource from the instance:
   blocking further calls for access to the resource from other instances of the plurality of instances;
   binding the instance to the resource;
   configuring the resource; and
   unblocking further calls for access to the resource from the other instances of the plurality of instances;
   wherein:
   the resource is allocated at runtime; and
   the resource is allocated for a subset of instances of the plurality of instances, wherein the subset of instances use the resource.

2. The computer-implemented method of claim 1, wherein:
   the resource is one of a storage volume or a networking component; and
   the configuring includes mounting the resource.

3. The computer-implemented method of claim 1, wherein the resource is a pre-requisite component, a configuration file, or secret information.

4. The computer-implemented method of claim 1, wherein the blocking, the binding, and the unblocking is performed by a function hook layer.

5. The computer-implemented method of claim 1, wherein the instance of the computer system includes local storage allocated responsive to a mounting failure.

6. An apparatus for provisioning resources associated with a plurality of instances of a computer system, the apparatus comprising:
   a function hook layer module which:
      intercepts a call for access to a resource from an instance of the plurality of instances, the computer system including a plurality of instances;
      dynamically provisioning cloud services in response to a first use of the resource within another service based on a file access interception; and
      responsive to the intercepted call being a first call for access to the resource from the instance:
         blocks further calls for access to the resource from other instances of the plurality of instances;
         binds the instance to the resource;
         configures the resource; and
         unblocks further calls for access to the resource from other instances of the plurality of instances;
   wherein:
      the resource is allocated at runtime; and
      the resource is allocated for a subset of instances of the plurality of instances, wherein the subset of instances use the resource.

7. The apparatus of claim 6, wherein:
the resource is one of a storage volume or a networking component; and
the configuring includes mounting the resource.

8. The apparatus of claim 6, wherein the resource is a pre-requisite component, a configuration file, or secret information.

9. The apparatus of claim 6, wherein the instance of the computer system includes local storage allocated responsive to a mounting failure.

10. A computer program product comprising a computer readable storage medium having a set of instructions stored therein which, when executed by a processor, causes the processor to provision resources associated with a plurality of instances of a computer system by:
   intercepting a call for access to a resource from an instance of the plurality of instances;
   dynamically provisioning cloud services in response to a first use of the resource within another service based on a file access interception;
   responsive to the intercepted call being a first call for access to the resource from the first instance:
   blocking further calls for access to the resource from other instances of the plurality of instances;
   binding the instance to the resource;
   configuring the resource; and
   unblocking further calls for access to the resource from the other instances of the plurality of instances;
   wherein:
   the resource is allocated at runtime; and
   the resource is allocated for a subset of instances of the plurality of instances, wherein the subset of instances use the resource.

11. The computer program product of claim 10, wherein:
the resource is one of a storage volume or a networking component; and
the configuring includes mounting the resource.

12. The computer program product of claim 10, wherein the resource is a pre-requisite component, a configuration file, or secret information.

13. The computer program product of claim 10, wherein the blocking, the binding, and the unblocking is performed by a function hook layer.

14. The computer program product of claim 10, wherein the instance of the computer system includes local storage allocated responsive to a mounting failure.

* * * * *